(12) United States Patent
Pedicini et al.

(10) Patent No.: US 6,248,464 B1
(45) Date of Patent: Jun. 19, 2001

(54) AIR-MANAGING SYSTEM FOR METAL-AIR BATTERY USING RESEALABLE SEPTUM

(76) Inventors: Christopher S. Pedicini, 10290 Willeo Creek Trace, Roswell, GA (US) 30075; John D. Witzigreuter, 4157 Springhill La., Kennesaw, GA (US) 30144

( * ) Notice: Subject to any disclaimer, the term of this patent is extended or adjusted under 35 U.S.C. 154(b) by 0 days.

(21) Appl. No.: 09/321,352

(22) Filed: May 27, 1999

Related U.S. Application Data

(63) Continuation-in-part of application No. 09/216,343, filed on Dec. 18, 1998.

(51) Int. Cl.$^7$ ................................................... H01M 12/00
(52) U.S. Cl. ................................. 429/27; 429/34; 429/82; 429/83; 429/71
(58) Field of Search ................................. 429/101, 34, 27, 429/82, 83, 71

(56) References Cited

U.S. PATENT DOCUMENTS

| | | |
|---|---|---|
| 1,299,149 | 4/1919 | Duvall . |
| 2,382,675 | 8/1945 | Sutherland et al. . |
| 2,745,894 | 5/1956 | Nowotny . |
| 2,880,259 | 3/1959 | Nowotny . |
| 3,865,631 | 2/1975 | Clayman . |
| 3,945,846 | 3/1976 | Dey . |
| 4,060,670 | 11/1977 | Tamminen . |
| 4,118,544 | 10/1978 | Przybyla et al. . |
| 4,189,526 | 2/1980 | Cretzmeyer et al. . |
| 4,360,573 | 11/1982 | Rao et al. . |
| 4,366,213 | 12/1982 | Tamminen . |
| 4,505,996 | 3/1985 | Simonton . |
| 4,525,439 | 6/1985 | Simonton . |
| 4,554,226 | 11/1985 | Simonton . |
| 4,649,090 | 3/1987 | Oltman et al. . |
| 4,816,354 | 3/1989 | Tamminen . |
| 5,069,986 | 12/1991 | Dworkin et al. . |
| 5,191,274 | 3/1993 | Lloyd et al. . |
| 5,356,729 | 10/1994 | Pedicini . |
| 5,362,577 | 11/1994 | Pedicini . |
| 5,486,429 | 1/1996 | Thibault . |
| 5,571,630 | 11/1996 | Cheiky . |
| 5,641,588 | 6/1997 | Sieminski et al. . |
| 5,691,074 | * 11/1997 | Pedicini .............................. 429/27 |
| 6,068,944 | * 5/2000 | Witzigreuter ........................ 429/27 |
| 6,087,029 | * 7/2000 | Golovin et al. ...................... 429/27 |

FOREIGN PATENT DOCUMENTS

| | | |
|---|---|---|
| 2 097 574 | 4/1982 | (GB) . |
| WO 97/15090 | * 4/1997 | (WO) ........................ H01M/12/06 |

* cited by examiner

Primary Examiner—Carol Chaney
Assistant Examiner—R. Alejandro
(74) Attorney, Agent, or Firm—Alston & Bird LLP

(57) ABSTRACT

An air-managing system for metal-air battery includes resealable septum and one or more hollow needles. The septum separates air pathway into two segments. One segment is from air cathodes of the battery to the septum and the other is from the septum to the outside air. The needles provide conduits to connect two segments. The septum recloses its torn portion when the needles are removed. Also disclosed is a reusable air manager including a fan and such needles. The air manager can be coupled to a disposable cell pack which has a septum that can be pierced by the needles.

11 Claims, 4 Drawing Sheets

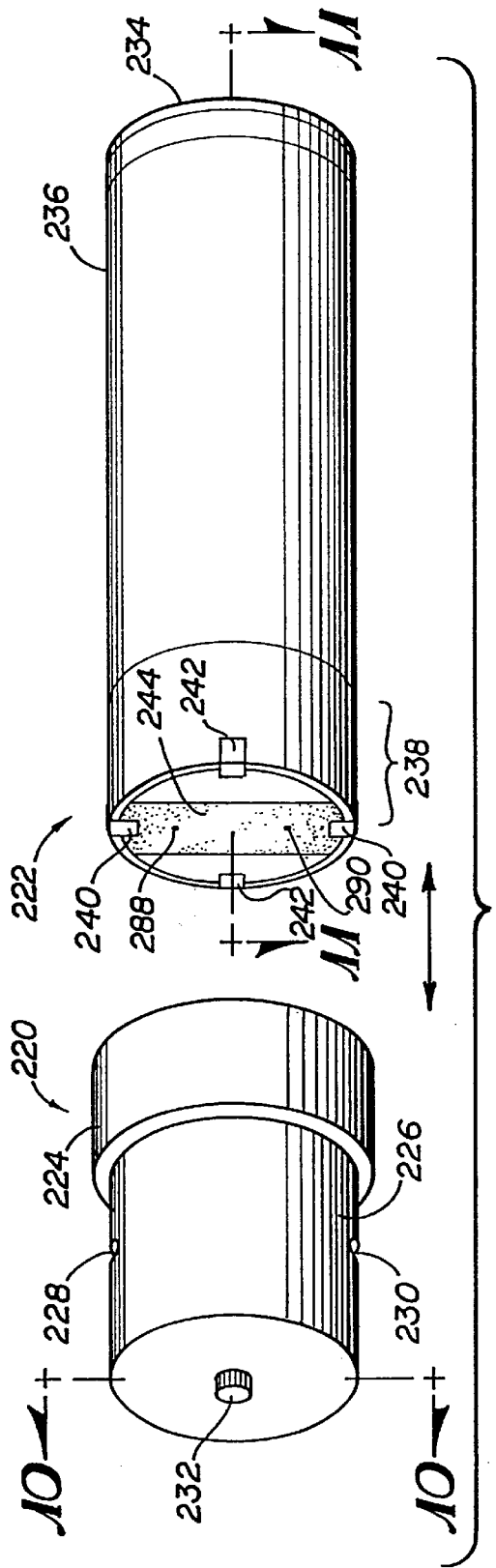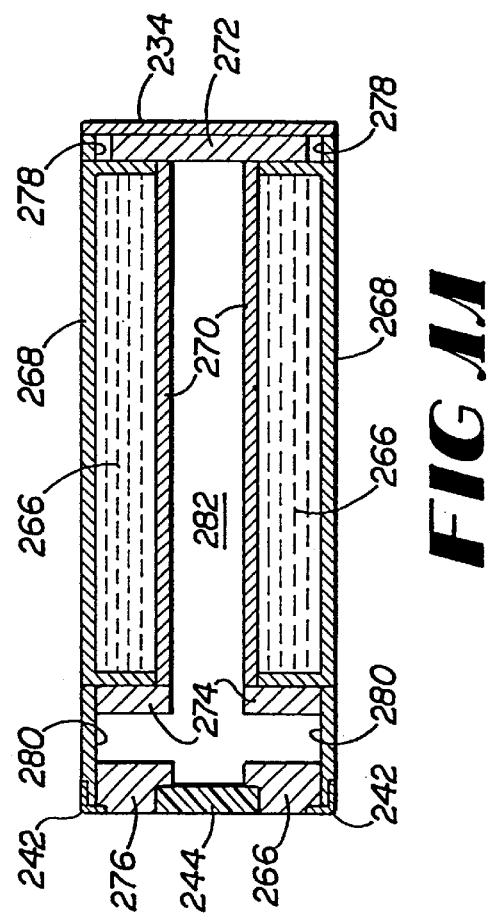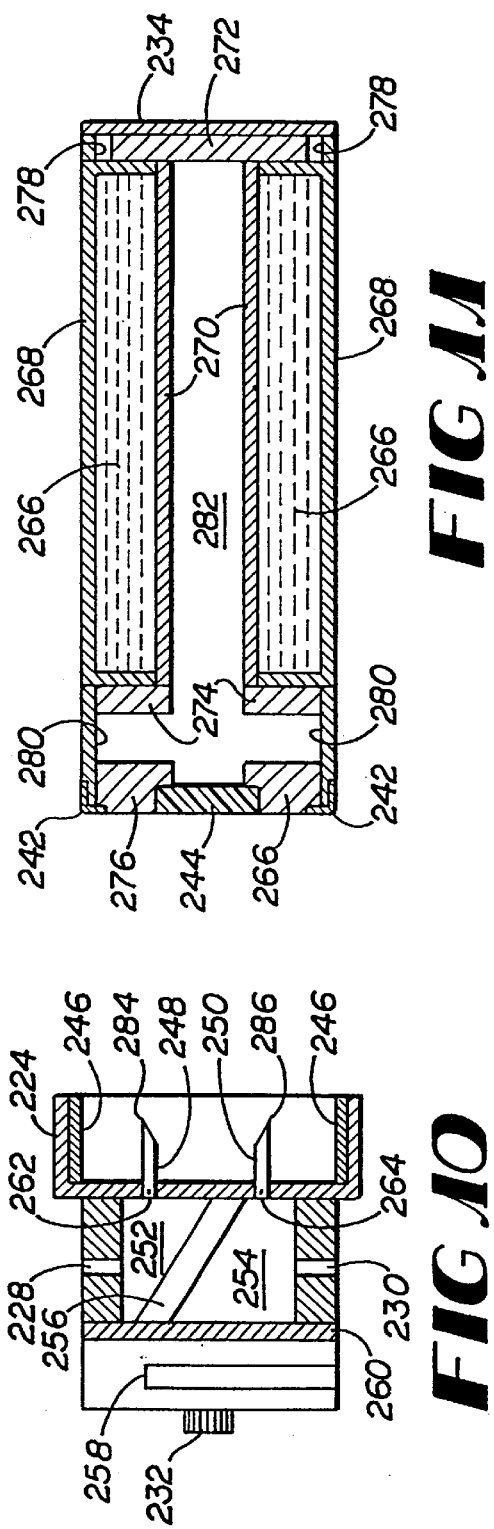

AIR-MANAGING SYSTEM FOR METAL-AIR BATTERY USING RESEALABLE SEPTUM

CROSS-REFERENCE TO RELATED APPLICATIONS

"This application is a continuation-in-part of pending U.S. Pat. application Ser. No. 09/216,343, " Air-Managing System for Metal-Air Batter Using Resealable Septum "filed Dec. 18,1998."

The following patent applications, all of which are incorporated herein by reference, contain related subject matter and are being filed concurrently with the present application.

CROSS REFERENCE TO RELATED APPLICATION

The present application is a division of U.S. application Ser. No. 09/216,343, filed Dec. 18, 1998.

"CYLINDRICAL METAL-AIR BATTERY WITH A CYLINDRICAL PERIPHERAL AIR CATHODE";

"AIR MANAGER SYSTEMS FOR METAL-AIR BATTERIES UTILIZING ADIAPHRAGM OR BELLOWS";

"AIR MOVER FOR A METAL-AIR BATTERY UTILIZING A VARIABLE VOLUME ENCLOSURE";

"DIFFUSION CONTROLLED AIR VENT WITH AN INTERIOR FAN";

"UNIFORM SHELL FOR A METAL-AIR BATTERY";

"LOAD RESPONSIVE AIR DOOR FOR A METAL-AIR CELL";

"GEOMETRY CHANGE DIFFUSION TUBE FOR METAL-AIR BATTERIES"; and

"AIR DELIVERY SYSTEM WITH VOLUME-CHANGEABLE PLENUM OF METAL-AIR BATTERY".

FIELD OF THE INVENTION

The present invention relates generally to batteries, and more particularly relates to an air-managing system for a metal-air battery.

DESCRIPTION OF THE RELATED ART

Metal-air battery cells include an air permeable cathode and a metallic anode separated by an aqueous electrolyte. During discharge of a metal-air battery, such as a zinc-air battery, oxygen from the ambient air is converted at the cathode to hydroxide, zinc is oxidized at the anode by the hydroxide, and water and electrons are released to provide electrical energy. Metal-air batteries have a relatively high energy density because the cathode utilizes oxygen from ambient air as a reactant in the electrochemical reaction rather than a heavier material such as a metal or metallic composition. Metal-air battery cells are often arranged in multiple cell packs within a common housing to provide a sufficient amount of power output. The result is a relatively lightweight battery.

To operate a metal-air battery cell, it is necessary therefore to provide a supply of oxygen to the air cathodes of the cells. An air manager system is typically used to provide reactive air and to isolate the air cathodes when the cell is idle. Some prior systems open air cathodes widely to the atmosphere or use a fan system to sweep a flow of new ambient air from openings across the air cathodes to supply oxygen at a rate sufficient to achieve the desired power output. The open air cathodes or the openings are generally sealed during non-use by sealing tapes, plugs, mechanical doors, etc. because the water vapor and oxygen in the ambient air would cause the cell to flood, dry out, or discharge in some circumstances, thereby leading to a reduction in cell efficiency and lifetime. Diffusion-controlling openings have been applied to the air manager, as shown in U.S. Pat. No. 5,691,074. However, a more strict isolation may sometimes be desired for a longer shelf life.

The above-described sealing systems such as a sealing-tape are generally designed for single use and require new sealing means such as a new tape to seal the opening again. Mechanical doors are usually durable and thereby can open and close the openings more than once. The doors typically are positioned on a battery housing case such that a disposable battery body may have door mechanisms, which may be reusable even after the battery loses its power. However, the mechanisms require expensive moving parts and they tend to leak.

Thus, there has been a need for a reusable and practical sealing system to prevent water vapor transfer and leakage current when the battery is not in use. The system should be simple and work repeatedly during a battery lifetime, and further minimize disposable parts to lower the cost and to protect the environment. Along these lines, it would be efficient not to have to dispose of an air manager when every cell pack reaches the end of its useful life. If the battery could be divided into a disposable part and a reusable part, a simple and reliable engaging means to connect two parts may be needed.

SUMMARY OF THE INVENTION

The invention seeks to provide an improved ventilation system and an improved ventilating method for a metal-air cell or battery, which has a long shelf life and retains essentially all its original power during a period of storage.

In accordance with the invention, this object is accomplished in a metal-air power supply system having two air pathway segments separated by a self-sealable septum, and a hollow needle to puncture the septum.

The present invention, therefore, provides a ventilation system for a metal-air battery having a housing or a case for enclosing at least one metal-air cell, at least one self-sealable septum, and one or more hollow needles. The case has at least one opening that is covered with the self-sealable septum and is sealed off from a reactive gas source or the outside air. Thus, the septum divides an air pathway into two segments. The first segment from an air cathode of the cell is enclosed in the case and terminated by the septum. The second segment to the outside air includes tubular passages of the hollow needles. When the needles penetrate the septum, the two segments are connected and the air pathway is completed to convey a reactive gas, e.g., oxygen, to the air cathode from the outside air.

The present invention provides a multi mode ventilation system for a metal-air battery with one or more openings connected to the outside air in the second segment. At least one air-moving device is disposed in the second segment such that the device may give a satisfactory air flow rate for required power. If the openings are preferably sized, leakage current of the cell may be lowered for non-use conditions when the air-moving device is off. Furthermore, the preferably sized openings prevent the cell from flooding and drying out by exchanging water vapor with the outside air. Thus, the lowest mode is for storage, a middle mode is for non-use, and the highest mode is to provide power with the air-moving device on.

The present invention further provides a power supply system having a cell pack with at least a self-sealable septum and an air-managing device with one or more hollow needles. The cell pack may be stored alone to maintain the original power. The air-managing device engages with the cell pack when the power supply is needed.

The present invention further provides an electric device with an air-managing device and a disposable cell pack with a self-sealable septum. The air-managing device is combined in the electric device such that the consumers may only have to buy a disposable cell pack.

The present invention further provides a cell pack including one or more metal-air cells in a housing which has air opening sealed by resealable septum.

The present invention further provides a reusable ventilation system that engages with an above-mentioned cell pack. The ventilation system has one or more hollow needles, at least one air moving device or fan, and one or more openings for air ingress and egress.

Other features and advantages of the present invention will become apparent upon reviewing the following description of preferred embodiments of the invention, when taken in conjunction with the drawings and the appended claims.

BRIEF DESCRIPTION OF THE DRAWING

FIG. 9 is a perspective view of a metal-air battery or a power supply according to a sixth embodiment of the present invention.

FIG. 10 is a vertical cross sectional view taken along line 10—10 of FIG.9.

FIG. 11 is a vertical cross sectional view taken along line 11—11 of FIG.9.

DESCRIPTION OF THE PREFERRED EMBODIMENT

Figure 1:
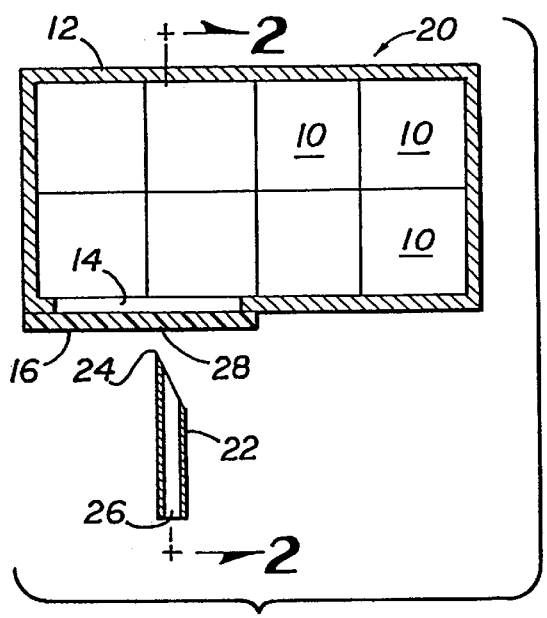
FIG. 1 is a diagrammatic top view of the cell pack case and the hollow needle embodying the present invention showing position of the cells, the opening, the septum, and the hollow needle, indicating the movement direction of the needle to engage the case.
Figure 2:
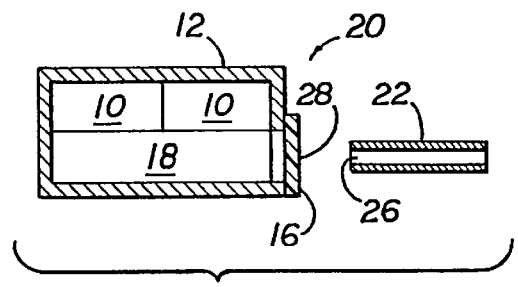
FIG. 2 is a vertical cross sectional view taken along line 2—2 of FIG. 1, showing the needle ready to pierce the septum the case.
Figure 3:
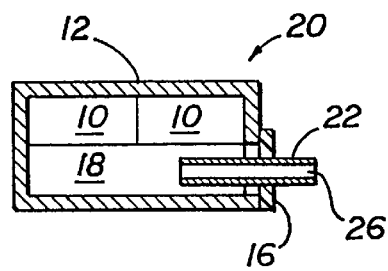
FIG. 3 is a vertical cross sectional view of the cell pack case engaged by the hollow needle.

Referring now in more detail to the drawings, in which like numerals refer to like parts throughout the several views, FIGS. 1, 2, and 3 show one embodiment of the present invention. This embodiment is suitable for continuous operation of the cells to provide power and to provide sufficient oxygen to generate the power without a fan. The metal-air battery includes a plurality of cells 10 enclosed within a cell case 12. Since the present invention applies to primary and secondary metal-air cells, the cells of the first embodiment and the following embodiments are similar to those disclosed and known. Suitable components for primary metal-air cells are described in U.S. Pat. No. 5,721, 065. Secondary cells also can be used with or without an air mover embodying the present invention, such as that described in U.S. Pat. No. 5,569,551. All types of metal-air cells may benefit by use of the present invention. The figures are exaggerated for illustration. Although the use of the invention with a zinc-air battery is disclosed, this invention should be understood as being applicable to other types of metal-air battery cells. The present invention can be used with primary or secondary batteries.

The case 12 isolates the plurality of cells 10 from the outside air and defines an opening 14 that is covered with a self-sealable septum 16. The cells 10 are generally arranged such that a reactant air plenum 18 is positioned under the cells 10. The air plenum 18 generally defines an air pathway to air cathodes of the cells 10. The septum 16 is affixed at a lower portion of the case 12 and terminates the air pathway at the opening 14. A cell pack 20 includes the cells 10, the plenum 18, the case 12, and the septum 16. The cell pack 20 does not have any air vents.

A hollow needle 22 is positioned so as to puncture the septum 16. The needle 22 may be supported by a board, a case, or the like such that reciprocal longitudinal motion of the needle is enabled. The needle 22 has a needle tip 24, a longitudinal tubular passage 26, and a circular cylindrical wall defining the passage. The needle 22 is preferably aligned perpendicular to the septum 16 so that a longitudinal motion of the needle 22 toward the septum 16 allows the needle tip 24 to pierce a portion 28 of the septum 16 and the septum material to surround tightly outside of the needle wall for sealing (FIG. 3). Part of the length of the needle 22 is inserted through the septum 16 and the needle is held by the septum material around the needle 22. Thus, the longitudinal tubular passage 26 provides an air pathway to the outside air.

By a longitudinal reverse motion of the inserted needle 22 (FIG. 3), the needle 22 is removed and the septum 16 re-loses and reseals the torn portion 28 to seal off the cell pack 20 from the outside air. This mechanism is similar to that of a vaccine bottle septum from which an inserted hypodermic needle is removed. The needle 22 may be repeatedly re-inserted through the septum 16 and removed from the septum 16 again.

The cell pack 20 may be stored before use or when the cells 10 are inactive. Because the cells 10 are not exposed to fresh air and because leakage current may be minimized, they tend to have a longer shelf life than any cell enclosed by a housing with air vents. When the cell pack 20 is in use or when the cells 10 are active, the hollow needle 22 punctures the septum 16 and the longitudinal tubular passage 26 provides an air pathway to the outside air as described before. Thus, the cells 10 supply enough current to power a load. The present invention, therefore, enables the cells to have a long shelf life and to supply enough power from time to time without using any complicated mechanical doors or any single-use tapes.

The longitudinal tubular passage or hollow portion 26 of the needle 22 is sized to satisfy a load power requirement for oxygen while it limits an air flow rate from the outside air. Thus, the tubular passage diameter may be constructed to allow the air flow. If the needle 22 is too thin, the tubular passage may allow too little air flow. If the needle 22 is too big, it may not be easy for the septum 16 to reclose the tubular passage. If the length is shorter than ⅛", it is difficult for the needle to puncture the septum 16 and/or the tube may not be able to limit the air flow rate to a desired maximum. If the length is longer than ½", it is difficult to handle the needle 22 and to puncture the septum 16 with the needle 22.

Any number of the longitudinal tubular passages 26, that is, any number of needles can be used to satisfy power requirement though FIG.1 shows single needle. Two or more needles may be preferable because one or more inlet and outlet tubular passages may be supplied. By way of example, if the same power as mentioned above is required for the cell pack 20 with two needles, each needle may have a tubular passage from 0.05 to 0.25 square inches in cross-sectional area and from 0.2 to 0.5 inches in length.

The case material is mechanically self-supporting and may be plastic, metal, ceramics, or another generally gas-impermeable material. Some gas permeability through a plastic housing can be tolerated. Materials inert to acid or base may be preferable since most electrolytes are acid or base. The septum 16 is typically made of rubber, a synthetic elastomer, or known compounds that give self-resealing characteristics to the septum 16. Suitable septum material includes that used to protect medicines in vials, such as silicone, PTFE/silicone, natural rubber, butyl rubber, PTFE/natural rubber, PTFE/butyl rubber, fluorocarbon rubber, Viton® etc. These materials are usually gas-impermeable, or hardly have permeability to water, which makes the cell pack well isolated from the outside air or any other reactive gas source and gives it a long shelf life. Further, low permeability prevents a high or low concentration of water vapor in the outside air from flooding or drying out the cells 10.

However, if it is preferable to have a high initial open cell voltage and to prevent consumers from finding that a new cell pack shows a very low voltage, a semi-permeable material may be employed. The semi-permeable material can pass oxygen or a reactive gas so as to keep an open cell voltage of the cells 10 high enough for immediate use. The septum material in this case is typically chosen from silicone rubber or resin, and other oxygen semi-permeable materials.

By way of example, if a typical silicone rubber that has an oxygen permeability coefficient of 19685 ($cm^3$-$mm/m^2 day$ atm) is used for the cell pack 20 with an open area of 6 $cm^2$, and if the required leakage current is about 1 ma, then the required oxygen flow rate is 5.47 $cm^3$/day at 25° Celsius. Thus, the thickness of the septum t may be given by $$t=19685 \times 6 \times 10^{-4} \times 0.21/5.47=0.45 \text{ (mm)}.$$

It should be understood that the above-mentioned limit of the size of the tubular passages, the opening, the septum, and the case depends on the power requirement and that the power requirement will vary depending upon the electric device to be engaged with the cell pack 20.

Figure 4:
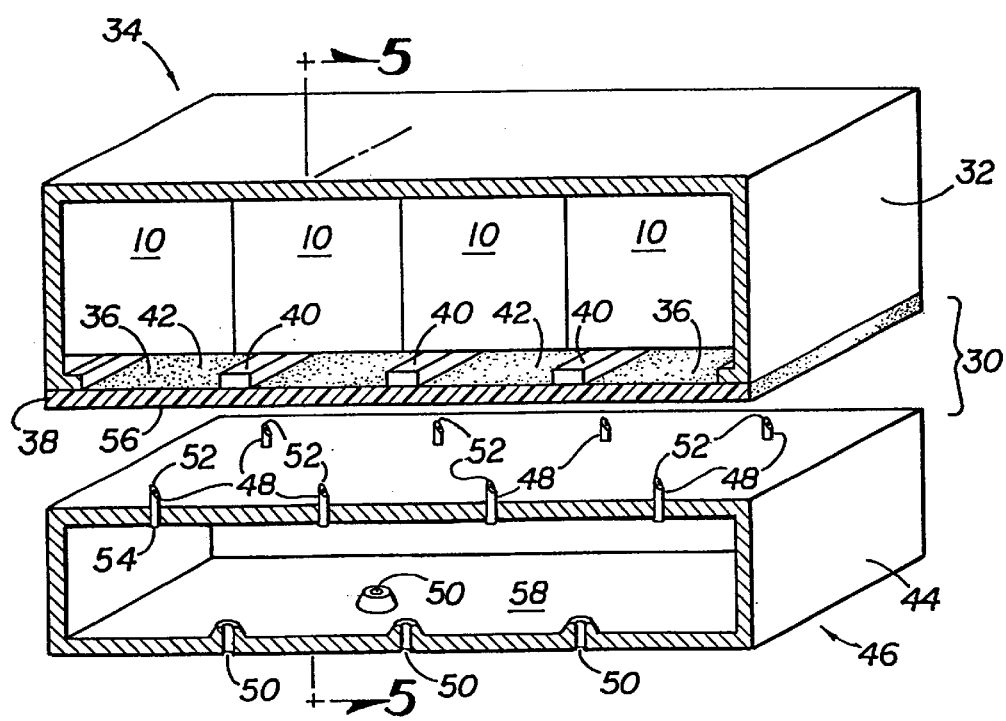
FIG. 4 is a diagrammatic perspective view of a second embodiment of the present invention showing a cell pack including a septum positioned adjacent to an air manager equipped with hollow needles.
Figure 5:
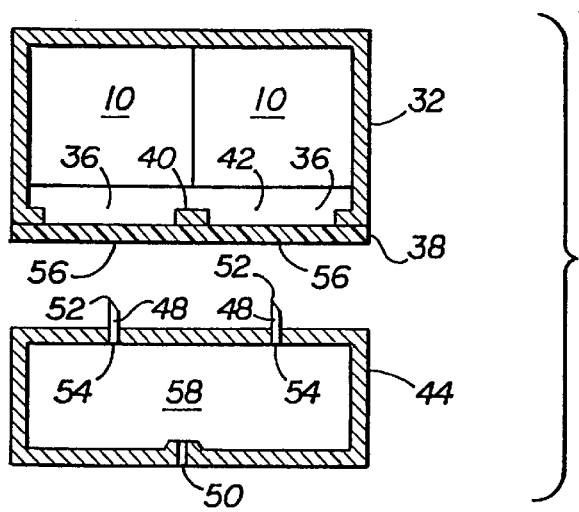
FIG. 5 is a vertical cross sectional view taken along line 5—5 of FIG.4.

Another embodiment of the present invention is shown in FIGS. 4 and 5. As with the first embodiment, the battery pack 30 is suitable for continuous use while engaged by air-admitting needles. The metal-air battery includes a plurality of cells 10 enclosed within a cell case 32. The figures are exaggerated for illustration. The case 32 defines a cell pack 34 and isolates the plurality of cells 10 from the outside air with the exception of openings 36 that are covered with a self-sealable septum 38. The openings 36 on the bottom surface of the cell pack 34 are defined by grids 40 that may divide each cell 10 and be made of a case material. The grids 40 may mechanically support the septum 38. In this embodiment, there is a small reactant air plenum 42 in the cell pack 34. The septum 38 is affixed on the bottom surface of the cell pack 34 and terminates an air pathway to the outside air at the openings 36. The cell pack 34 therefore does not have any air vents on the cathode side of the separator between the air cathode and the electrolyte.

A plenum case 44 defines an air plenum box 46 and has a plurality of hollow needles 48 and openings 50. The air plenum box 46 may be positioned and serve as an air collection plenum. The hollow needles 48 having sharp needle tips 52 and longitudinal tubular passages 54 are positioned on the upper surface of the air plenum box 46. Any number of needles at any place of the upper surface may be used to satisfy the power requirement. It is preferable to have one or more needles in each opening 36.

As described in the first embodiment, the cells 10 are isolated from the outside air to have leakage current minimized and to have a long shelf life when they are not used, inactive, or in the storage. The plenum box 46 engages with the cell pack so that the needle tips 52 pierce portions 56 of the septum 38 and that the needles 48 penetrate the septum 38 to provide air pathways to an air plenum 58 when the cell pack 34 is in use or the cells 10 are active. The total cross-sectional area of the tubular passages 54 are generally larger than that of the openings 50 so that the total air flow through the tubular passages 54 is larger than that through the openings 50. Therefore, right after the engagement, the current available from the cells 10 increases rapidly consuming a reactive gas, e.g. oxygen, in the plenum 58 and gradually decreases upon using up the stored oxygen. Finally the available current becomes constant and is determined by the air flow rate through the openings 50. Thus, the current characteristics satisfactory for an initial high power requirement of a connected electric device may be controlled by the total cross sectional areas of the tubular passages 54 and the openings 50, and volume of the plenum 58.

If the steady current needs to be very low, the openings 50 are preferably sized such that their length, i.e., the direction through the thickness of the case 44 is greater than their width, i.e., the direction perpendicular to the thickness of the case 44 such that diffusion of air through the openings 50 may be substantially limited. By "substantially limited," it is meant that the rate of diffusion of oxygen or contaminates through the openings 50 is so slow that humidity transfer is sufficiently small and has little appreciable impact on the efficiency or lifetime of the cell 10 after the output current becomes almost constant.

As described in the first embodiment, the plenum box 46 may be disengaged from the cell pack 34 such that the needles 48 may be removed from the septum 38, which will reseal itself. Thus, the used cell pack may keep its residual power during a period of storage. Further, the septum 38 may be made of a semi-permeable material such that the initial open cell voltage will remain high enough after a long storage as mentioned above. The sizes, the number, and the materials of the case 32, the openings 36, the septum 38, the plenum box 46, the needles 48, their tubular passages 54, and the openings 50 may be preferably varied as described in connection with the first embodiment. In particular, the needles 48 may preferably be shorter for handling without losing their functions.

Figure 6:
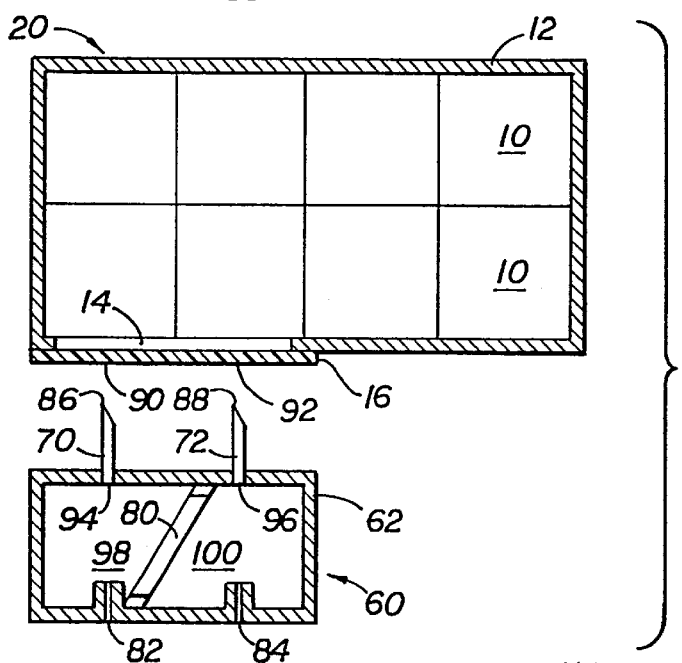
FIG. 6 is a diagrammatic top view of a cell pack adjacent to an air manager of a third embodiment of the present invention.

In the first two embodiments, to protect the cells from flooding or drying out during times when no load is connected to the battery, the battery pack must be disengaged to reseal the septum. Another embodiment is shown in FIG. 6, which has the same cell pack 20 as shown in FIG. 1. This embodiment provides a battery pack that can remain engaged with needles through a septum without being subject to flooding or drying out. The features of the cell pack 20 are the same as described in connection with the first embodiment. However, it shows an air manager 60 with an air manager case 62, two needles 70, 72, a fan 80 as an air-moving device, and two diffusion limiting tubes or isolation tubes 82, 84 connected to the outside air through a wall of the case 62.

The air manager is positioned such that the needles 70, 72 can penetrate the septum 16. The needles 70, 72 are hollow and their needle tips 86, 88 are sharp to pierce portions 90, 92 of the septum 16 as described in the first embodiment. The needles 70, 72 are positioned on the upper surface of the air manager case 62 such that the air manager may engage with the septum 16 under the cell pack 20. The air manager case 62 is essentially impermeable such that two tubular passages 94, 96 of the needles 70, 72 and the openings 82, 84 are the only pathways to the outside of the case 62. The fan 80 is positioned in the case so as to divide space inside of the case 62 into two chambers 98, 100 and make an air flow and/or pressure difference in the case such that an outlet air flow from the cells through the tubular passage 94 and an inlet air flow to the cells through the tubular passage 96 may occur. Pressurization of the chamber 100 causes air to flow through the tubular passage 96 and also out of the chamber 100 to the outside, through the tube 84. At the same time the low pressure created in the chamber 98 causes air to be drawn from the cells through the tubular passage 94, and make-up air is drawn into the chamber 98 from outside through the tube 82. The make-up air is then re-circulated between the air manager and the cells.

The sizes of the tubular passages 94, 96 are generally larger than those of the openings 82, 84 such that an air flow resistance of the tubular passages 94, 96 may be smaller than that of the openings 82, 84. Thus, more air generally moves through the tubular passages 94, 96 in the re-circulation process.

When the cell pack 20 is not engaged with the air manager, the cell case 12 and the septum 16 isolate the cells 10 such that the cells 10 have a long shelf life. When the cells 10 are in use or are active, the air manager 60 engages with the cell pack 20 with the needles 70, 72 penetrating the septum 16 to about halfway along their length. Thus, the tubular passages 94, 96 provide air pathways from the air cathodes (not shown) of the cells 10 to the chambers 98, 100 of the air manager 60. If the chambers 98, 100 are large and filled with a reactive gas and if the tubular passages 94, 96 are wide, the initial available current characteristics are similar to those described in connection with the second embodiment. Since the openings 82, 84 are diffusion limiting tubes, the cells 10 may have a long shelf life when the fan 80 is off, even when the septum remains pierced by the needles 70, 72. The tubular passages 94, 96 could alternatively be the diffusion limiting tubes in a way of isolating the cells 10.

The diffusion limiting tube may be referred to as an isolating passageway or a diffusion limiting passageway due to its isolating capability. In accordance with an example in U.S. Pat. No. 5,691,074, the diffusion limiting passageways function to limit the amount of oxygen that can reach air cathodes to minimize the self discharge and leakage or drain current of a metal-air cell.

The diffusion limiting passageways 82, 84 (or alternatively 94, 96) also minimize the detrimental impact of humidity on the metal-air cell, when the fan 80 is not forcing air flow through the diffusion limiting passageways 82, 84 (or alternatively 94, 96). A metal-air cell that is exposed to ambient air having a high humidity level may absorb too much water through its air electrode and fail due to a condition referred to as "flooding". Alternatively, a metal-air cell that is exposed to ambient air having a low humidity level may release too much water vapor form its electrolyte through the air electrode and fail due to a condition referred to as "drying out".

The efficiency of the isolating or diffusion limiting passageway in terms of the transfer of air and water into and out of a metal-air cell can be described in terms of an "isolation ratio". The "isolation ratio" is the ratio of the rate of water loss or gain by a cell while its oxygen electrodes are fully exposed to the ambient air, as compared to the rate of the water loss or gain of the cell while its oxygen electrodes are isolated from the ambient air, except through one or more limited openings, that is, diffusion limiting passageways. For example, given identical metal-air cells having electrolyte solutions of approximately thirty-five percent (35%) KOH in water, an internal relative humidity of approximately fifty percent (50%), the ambient air having a relative humidity of approximately ten percent (10%), and no fan-forced circulation, the water loss from a cell having an oxygen electrode fully exposed to the ambient air should be more than 100 times greater than the water loss from a cell having an oxygen electrode that is isolated from the ambient air, except through one or more diffusion limiting passageways. In this example, an isolation ratio of more than 100 to 1 should be obtained.

More specifically, each of the diffusion limiting passageways 82, 84 (or alternatively 94, 96) preferably has a width that is generally perpendicular to the direction of flow therethrough, and a length that is generally parallel to the direction of flow therethrough. The length and the width are selected to substantially eliminate air flow and diffusion through the diffusion limiting passageways 82, 84 (or alternatively 94, 96) while the air moving device is not forcing air flow through the diffusion limiting passageways 82, 84 (or alternatively 94, 96). The length is greater than the width, and more preferably the length is greater than about twice the width. The use of larger ratios between length and width are preferred. Depending upon the nature of the metal-air cells, the ratio can be more than 200 to 1. However, the preferred ratio of length to width is about 10 to 1.

The isolating or diffusion limiting passageways 82, 84 (or alternatively 94, 96) could form a portion of the air path must take between the ambient and the oxygen electrodes. Each of the diffusion limiting, passageways 82, 84 (or alternatively 94, 96) may be defined through the thickness of the case 62, but preferably they are in the form of tubes as described above.

In general, the diffusion limiting, passageways may be cylindrical, and for some applications each can have a length of about 0.3 to 2.5 inches or longer, with about 0.88 to 1.0 inches preferred, and an inside diameter of about 0.03 to 0.3 inches, with about 0.09 to 0.19 inches preferred. The total open area of each diffusion limiting passageway for such applications, measured perpendicular to the direction of flow therethrough, is therefore about 0.0007 to 0.5 square inches. In other applications, the diffusion limiting passageways each can have a length of about 0.1 to 0.3 inches or longer, with about 0.1 to 0.2 inches preferred, and an inside diameter of about 0.01 to 0.05 inches, with about 0.15 inches preferred. The preferred dimensions for a particular application will be related to the geometry of the passageways and the cathode plenums, the particular air mover utilized, and the volume or air needed to operate the cells as a desired level.

By way of example, in a preferred embodiment of a cell pack 20 designed to power a portable computer (not shown), a 6-volt battery with 6 cells 10 is used. Each cell 10 has an output of about 1 volt or slightly higher at about 1 to 4 amps. Each cell 10 has an exposed cathode area (not shown) of about 18 to 22 square inches for a total exposed cathode area of about 108 to 132 square inches. The battery therefore has a current density of about 50 to 200 ma per square inch of cathode surface. In order to satisfy this power requirement, an air flow from 33 to 200 cubic inch/min is needed.

The diffusion limiting passageways are not necessarily cylindrical, as any cross-sectional shape that provides the desired isolation is suitable. The isolating passageways need not be uniform along their length, so long as at least a portion of each diffusion limiting passageway is operative to provided the desired isolation. Further, the diffusion limiting passageways may be straight or curved along their length. In fact, a diffusion limiting passageway may be formed by a gap between spaced apart two-dimensional surfaces, so long as the air molecules must follow a sufficiently restricted path to move from the ambient air to the air cathode. Other exemplary diffusion limiting passageways and systems are disclosed in U.S. Pat. No. 5,691,074 and U.S. application SER. No. 08/556,613, and the entire disclosure of each of those documents is incorporated herein by reference.

Referring again to FIG. 6, when the fan 80 is turned on, a relatively large amount of air flow comes from the outside of the air manager case 62 through the opening 82, mixes with air flow coming through the tubular passage 94, and goes into the plenum 18 through the tubular passage 96 and out of the case 62 through the opening 84. Thus, the cell pack can supply a connected electric device with required power. The fan's rotational speed may be adjusted to supply the required power. The fan is operated with power from the cells 10, and is connected by leads and terminals not shown in FIG. 6.

Since the openings 82, 84 are diffusion limiting passageways, air flow through the passageways 82, 84 may be more quantitative. The passageways 82, 84 are, thereby, preferably constructed and arranged to allow a sufficient amount of air flow therethrough while the air moving device or the fan 80 is operating so that a sufficient output current, typically at least 50 ma, and preferably at least 130 ma can be obtained from the metal-air cells 10. In addition, the diffusion limiting passageways 82, 84 are preferably constructed to limit the air flow and diffusion therethrough such that the drain current that the metal-air cells are capable of providing to a load while the fan 80 is not forcing air flow through the passageways 82, 84 is smaller than the output current by a factor of about 50 or greater. Thus, when the fan 80 is off and the humidity level within the cell is relatively constant, only a very limited amount of air diffuses through the passageways. The water vapor within the cell protects the air cathodes (not shown) from exposure to oxygen. The air cathodes are sufficiently isolated from the ambient air by the water vapor such that the cells 10 have a long shelf life without sealing the passageways 82, 84 with mechanical air doors or the like. In addition, the diffusion limiting passageways 82, 84 are preferably constructed to provide the isolation ratio of more than 50 to 1.

When the air manager 60 is disengaged from the cell pack 20, the cells 10 are essentially isolated from the outside air, and the drain current can be as low as the storage modes before first use of the cell pack 20. With the help of the semi-permeable septum 16, an initial open cell voltage may be maintained. When the air manager 60 engages the cell pack 20, the openings 82, 84 may be the only air pathways to the outside air and the drain current mode with the fan off is reduced as described above. When the fan is turned on, the current to a load can be varied between several modes adjusted by the fan speed control to satisfy the power requirement.

Since the air manager 60 may be reusable with other cell packs even after the cell pack 20 discharges its energy, it is possible to minimize disposable parts. The sizes, the number, and the materials of the case 12, the openings 14, the septum 16, the plenum 18, the air manager case 62, the needles 70,72, their tubular passages 94,96, the chambers 98, 100, the fan 80, and the openings 82, 84 may be preferably changed as described in connection with similar parts used in the earlier embodiments.

In particular, if the needles 70,72 are large such that their tubular passages 94,96 may be larger than the diffusion limiting tubes, the fan 80 may inhale more air flow from the outside. Thus, the air cathode is exposed to air including higher concentration of oxygen so that the battery may supply more energy when the fan 80 is on. On the other hand, when the fan 80 is off and the air manager 60 engages with the cell pack 20, that is, when the battery is temporarily inactive, the cells are less isolated from the ambient air that may have a high or low humidity level so that the cells 10 are more likely to fail due to a condition referred to as "flooding" or "drying out" as described before. This may be prevented, if the air manager 60 is disengaged from the cell pack 20 such that the air passageways are re-closed by the septum 16.

Figure 7:
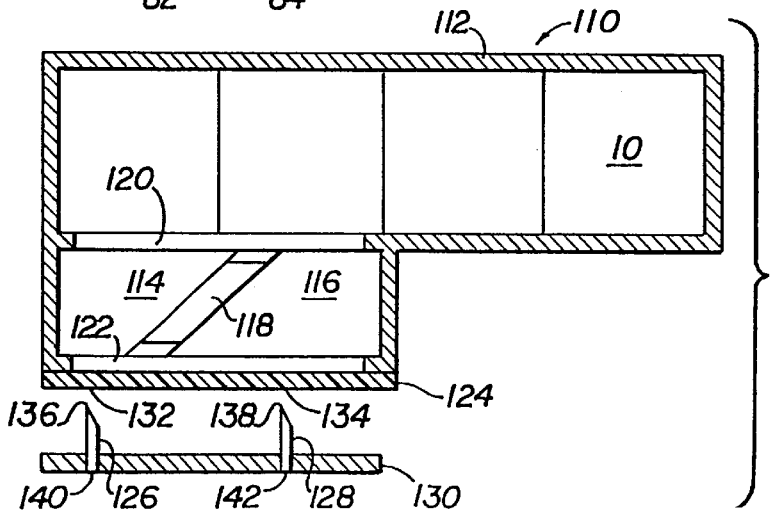
FIG. 7 is a diagrammatic top view of a cell pack incorporating an air-moving device, and adjacent to a puncturing device of a fourth embodiment of the present invention.

Another embodiment of a cell pack 110 according to the present invention is shown in FIG. 7. A cell pack case 112 encloses cells 10, a reactive air plenum (not shown), and an air manager portion including two chambers 114, 116 separated by a fan 118. An opening 120 connects the chambers 114, 116 to the plenum. An opening 122 extends across both chambers 114, 116 and is covered with a septum 124 and sealed off from the outside air. The air manager is an air-moving device having the fan 118 to make air flow and/or pressure difference between two chambers 114 and 116. Two needles 126, 128 secured to a needle board 130 are positioned so as to puncture portions 132, 134 of the septum 124. The needles 126, 128 have sharp needle tips 136, 138 and tubular passages 140, 142 as described in the other embodiments.

When the cells 10 are not in use or inactive, the needles 126, 128 are apart from the septum 124 and cell isolation is maximized as described above. If the septum 124 is made of a semi-permeable material, a satisfactory initial open cell voltage may be maintained during storage. When the cells 10 are in use or active, the needles 126, 128 penetrate the septum 124 at portions 132, 134 to provide air pathways from air cathodes (not shown) of the cells to the outside air. When the fan is turned on, the air is circulated with make-up fresh air through the tubular passages 140, 142 and the load current is adjusted by varying the fan speed to satisfy a high power requirement of a connected electric device.

If the cell pack must be well isolated when the fan is off, the tubular passages may be sized to be diffusion limiting isolation tubes as described above. When the needles 126, 128 are apart from the septum 124, the cells 10 are essentially isolated from the outside air and the drain current may be minimized to as low a mode as the storage modes existing before first use of the cell pack 110. With the help of the semi-permeable septum 124, an initial open cell voltage may be maintained. When the needles 126, 128 penetrate the septum 124 at portions 132, 134, the tubular passages 140, 142 may be the only air pathways to the outside air and the drain current mode with the fan off is reduced as described above. When the fan is turned on, the current to a load can be varied between several modes adjusted by the fan speed control to satisfy the power requirement.

In this embodiment, a small part such as the needle board 130 can start the cell pack so as to be a switch without any electrical contacts, and provide power to a battery-preinstalled electric device. The sizes, the number, and the materials of the case 112, the openings 120, 122, the septum 124, the plenum (not shown), the chambers 114, 116, the fan 118, the openings 120, 122, the needles 126, 128, their tubular passages 140, 142, and the board 130 may preferably be changed for the purposes described above.

Figure 8:
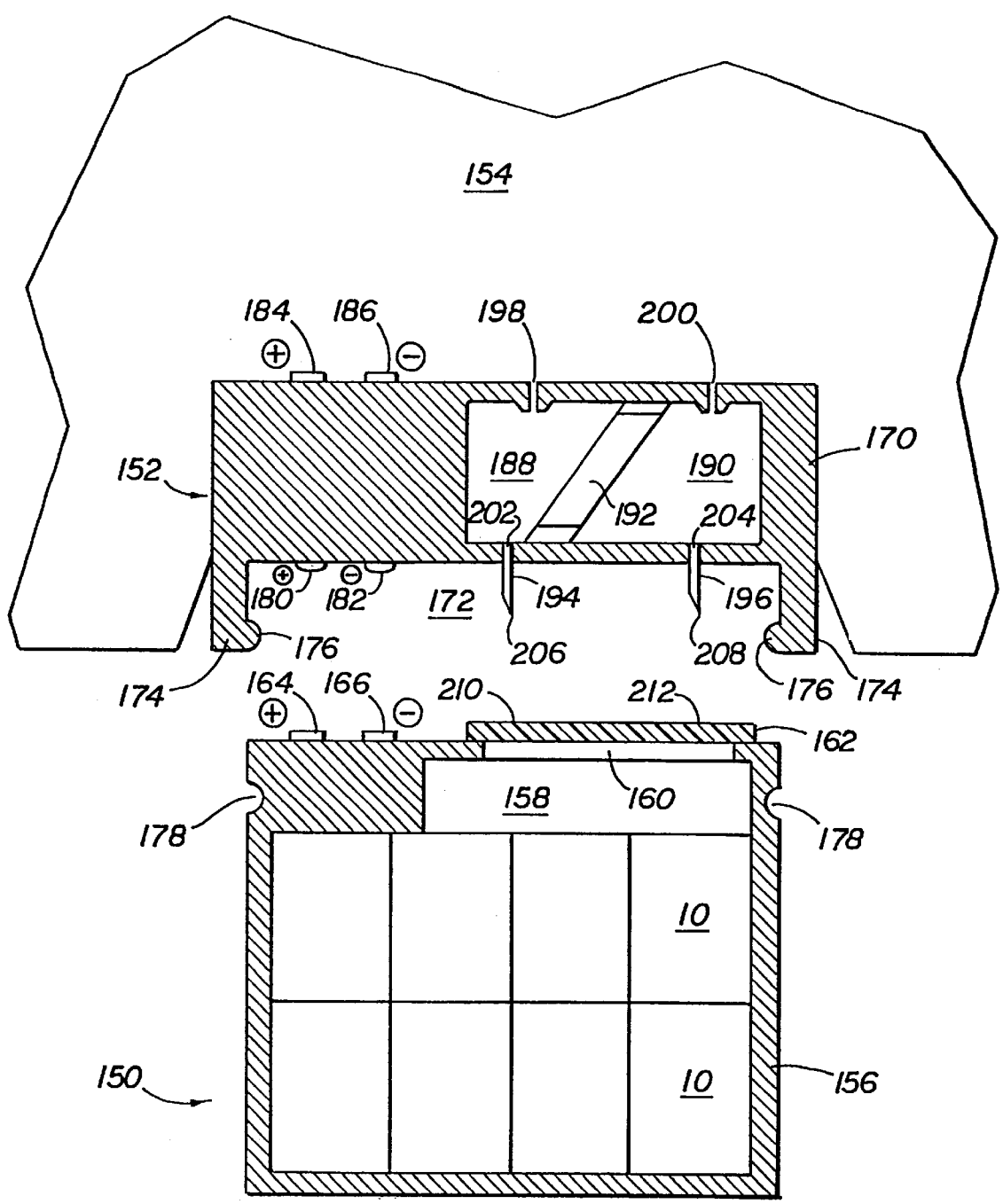
FIG. 8 is a diagrammatic top view of a cell pack and an air-moving device contained in an electric device according to a fifth embodiment of the present.

Another embodiment is shown in FIG. 8, which includes a cell pack 150, and an air-managing head 152, mounted in an electric device 154. The cell pack 150 includes a case 156, cells 10, a reactive air plenum below the cells (not shown), and an extra plenum 158, adjacent to an opening 160 covered by a septum 162. A pair of terminals 164, 166 connected to positive and negative leads (not shown) from the cells 10 are positioned on the exterior of the case 156 facing the air-managing head 152. The case 156 isolates the cells from the outside air with the help of the septum 162 as described in the other embodiments. The extra plenum 158 may diffuse and mix fresh and residual air inside of the case 156 and supply each air cathode evenly with reactive gas, i.e., oxygen. In the alternative, the extra plenum may be omitted, in which case the needles are directed into the reactive air plenum. If the septum 162 is made of a semi-permeable material, an initial open cell voltage may be maintained during storage.

The air-managing head 152 includes a case 170, which defines an outwardly facing rectangular recess 172 for receiving the cell pack 150. Two engaging arms 174 with knobs 176 define the recess to receive and engage with a portion of the cell pack 150. Two recesses 178 on opposite exterior walls of the cell pack case 156 receive the knobs 176 with force caused by elastic bending of the arms 174 in a similar way as a ratchet mechanism. Two terminals 180, 182 are positioned on a back wall of the recess 172 to engage the terminals 164, 166, respectively. Two electrical terminals 184, 186 or hard wiring are provided on the other side of the head 152 to supply the electric device 154 with electrical power from the cell pack 150.

Two chambers 188, 190 are formed in the air-managing head 152 separated by an air mover such as a fan 192. A needle 194 extends out from the chamber 188 and a needle 196 extends out from the chamber 190. The chambers 188, 190 are connected to outside air through tubes 198, 200, respectively. The tubes 198, 200 (shown diagrammatically) preferably are diffusion limiting isolation tubes of the type described above, and the needles 194, 196 have larger openings 202, 204 designed for free air flow rather than isolation purposes.

Thus, the cell pack 150 is removably held by the air-managing head 152 coinciding with the needles 194, 196 penetrating the septum 162. The needles 194, 196 have sharp needle tips 206, 208 to pierce portions 210, 212 of the septum 162 and the tubular passages 202, 204 to provide air pathways between air cathodes (not shown) of the cells 10 and the two chambers 188, 190.

The fan 192 makes an air flow and/or pressure difference between two chambers 188 and 190, the fan 192 being disposed in-between. The openings 198, 200 communicate with the outside air or a reactive gas source such that the reactive gas, e.g., oxygen can come through one of the openings 198, 200 and one of the tubular passages or openings 202, 204 to reach the air cathodes of the cells 10, in a manner described above.

In this embodiment, the air-managing head 152 is installed in the electric device 154 such that the consumers need only buy the cell pack 150. The cell pack can be stored in completely sealed conditions with an impermeable septum 162 or an impermeable tape (not shown) can be affixed on a semi-permeable septum 162. In the latter case, retail stores may stock the cell pack 150 after removing the tape or consumers may remove the tape sometime before use, so that the cell pack has a satisfactory initial open cell voltage. The sizes, the number, and the materials of the case 156, the opening 160, the septum 162, the plenum (not shown), the extra plenum 158, the chambers 188, 190, the fan 192, the openings 198, 200, the needles 194, 196, their tubular passages 202, 204, and other parts may preferably be changed as described above.

Another embodiment is shown in FIGS. 9, 10, and 11. A cylindrical metal-air battery or power supply has an air-managing head 220 and a cell pack 222 like the embodiment shown in FIG. 6. The air-managing head 220 has a cylindrical coupling 224, an outer case 226, two openings 228, 230, and a positive terminal 232. The cell pack has a negative terminal 234, an outer case 236, and a coupling portion 238 with two positive terminals 240, two negative terminals 242, and an elongate self-sealable septum 244.

The air-managing head 220 further includes two positive terminals 246 disposed inside of the circular cylinder 224 opposite to each other, two negative terminals (not shown) disposed inside of the circular cylinder 224 in orthogonal positions to the positive terminals 246, two hollow needles 248, 250 parallel to the axial direction of the battery, two chambers 252, 254 divided by a fan 256, and a fan controller 258.

The two chambers 252, 254 are defined with a circular plate 260 and other walls, and formed in the air-managing head 220 separated by an air mover such as the fan 256. The needle 248 extends out from the chamber 252 and the needle 250 extends out from the chamber 254. The chambers 252, 254 are connected to outside air through openings 228, 230, respectively. The openings 228, 230 (shown diagrammatically) preferably are diffusion limiting isolation tubes of the type described above, and the needles 248, 250 have larger openings 262, 264 designed for free air flow rather than isolation purposes.

The cell pack 222 further includes two cells having anode gels 266, anode containers 268, air cathodes 270, insulating end plates 272, 274, 276, current collectors and leads 278, 280, and an air plenum 282. The end plate 276 has a slit opening covered with the elongate septum 244. The two negative terminals 242 are connected to the anode containers 268 with leads 280. The two positive terminals 240 are connected to current collectors (not shown) of the air cathodes 270 with leads (not shown). These four terminals are positioned on the exterior circular periphery of the coupling portion 238 so as to connect to corresponding terminals inside of the cylindrical coupling 224 of the air-managing head 220 in order to supply the fan 256 with electric power. The positive terminal 232 of the power supply is also connected to the terminals 246 with leads (not shown). The fan controller 258 also is connected to control the supply of electric current from the cell pack 222 to the fan 256. If the elongate septum 244 is made of a semi-permeable material, a satisfactory initial open cell voltage may be maintained during storage.

The cell pack 222 may be removably held by the air-managing head 220 coinciding with the needles 248, 250 penetrating the elongate septum 244. To selectively lock the cell pack 222 to the head 220, a connector (not shown) may be provided, such as the knobs and recesses of the previous embodiment. The needles 248, 250 have sharp needle tips 284, 286 to pierce portions 288, 290 of the septum 244, and the tubular passages 262, 264 provide air pathways from air cathodes 270 of the cells to the two chambers 252, 254.

The fan 256 makes an air flow and/or pressure difference between two chambers 252 and 254. The openings 228, 230 communicate with the outside air such that oxygen can come through one of the openings 228, 230 and one of the tubular passages 262, 264 to reach the air cathodes 270 of the cells, in a manner described above.

In this embodiment, the air-managing head 220 is separable for re-use such that the consumers need only buy the cell pack 222. The cell pack can be stored in completely sealed conditions with an impermeable septum 244 or an impermeable tape (not shown) can be affixed on a semi-permeable septum 244. In the latter case, retail stores may stock the cell pack 222 after removing the tape or consumers may remove the tape sometime before use, so that the cell pack has a satisfactory initial open cell voltage. The sizes, the number, and the materials of the case 236, the septum 244, the plenum 282, the chambers 252, 254, the fan 256, the openings 228, 230, the needles 248, 250, their tubular passages 262, 264, and other parts may preferably be changed as described above. In particular, the cylindrical coupling 224 may be formed in the same size as the outer case 226 such that the whole battery is formed in a regular battery size such as "AA".

The above description is that of preferred embodiments of the invention. Various alterations and changes can be made without departing from the spirit and broader aspects of the invention as set forth in the appended claims, which are to be interpreted in accordance with the principles of patent law, including the Doctrine of Equivalents.

What is claimed is:

1. A method of providing reactive gas to an air electrode of a metal-air cell, comprising:

enclosing said cell in an enclosure at least a portion of which comprises a puncturable, resealable septum; and puncturing said septum with a hollow needle connected to a source of said reactive gas.

2. The method of claim 1, further comprising withdrawing said needle from said septum to isolate said cell from said source of said reactive gas.

3. The method of claim 2, further comprising moving reactive gas through said hollow needle.

4. The method of claim 3, wherein the step of moving reactive gas comprises moving said reactive gas with an air moving device commonly mounted with said hollow needle and positioned to create a pressure difference across said hollow needle.

5. The method of claim 4, wherein the step of withdrawing said needle from said septum comprises removing said enclosure from engagement with said commonly mounted hollow needle and air moving device.

6. The method of claim 1, wherein said hollow needle comprises a diffusion limiting passageway.

7. The method of claim 1, wherein said septum is semi-permeable to said reactive gas.

8. The method of claims 1, further comprising moving reactive gas through an air pathway segment within said enclosure between the air electrode and the hollow needle.

9. The method of claim 8, wherein said air pathway segment comprises a diffusion limiting passageway.

10. The method of claim 9, wherein said step of moving reactive gas comprises moving said reactive gas with an air moving device commonly mounted with said hollow needle and positioned to create a pressure difference across said hollow needle.

11. The method of claim 10, further comprising withdrawing said needle from said septum, comprising removing said enclosure from engagement with said commonly mounted hollow needle and air moving device.

* * * * *